(12) United States Patent
Liu (10) Patent No.: US 12,438,427 B2
(45) Date of Patent: Oct. 7, 2025

(54) SUSPENDED VIBRATION EXCITER, HYPERBOLIC-WAVE VIBRATION GENERATOR AND METHOD FOR GENERATING VIBRATION EXCITATION

(71) Applicant: Shanghai Xinjing Shengyu Health Technology Co., Ltd, Shanghai (CN)

(72) Inventor: Yitong Liu, Shanghai (CN)

(73) Assignee: Shanghai Xinjing Shengyu Health Technology Co., Ltd, Shanghai (CN)

( * ) Notice: Subject to any disclaimer, the term of this patent is extended or adjusted under 35 U.S.C. 154(b) by 309 days.

(21) Appl. No.: 18/333,049

(22) Filed: Jun. 12, 2023

(65) Prior Publication Data

US 2024/0213866 A1    Jun. 27, 2024

(30) Foreign Application Priority Data

Dec. 22, 2022   (CN) .......................... 202211658740.5

(51) Int. Cl.
*H02K 33/02*  (2006.01)
*H02K 5/04*   (2006.01)
*H02K 33/18*  (2006.01)

(52) U.S. Cl.
CPC ............... *H02K 33/02* (2013.01); *H02K 5/04* (2013.01); *H02K 33/18* (2013.01)

(58) Field of Classification Search
CPC ........... H02K 33/02; H02K 5/04; H02K 33/18
See application file for complete search history.

(56) References Cited

U.S. PATENT DOCUMENTS

| | | | | |
|---|---|---|---|---|
| 2013/0076178 A1* | 3/2013 | Kuroda | ................. | H02K 33/00 310/81 |
| 2013/0221767 A1* | 8/2013 | Akanuma | .............. | H02K 33/02 310/15 |
| 2020/0044544 A1* | 2/2020 | Tang | ...................... | H02K 33/16 |

FOREIGN PATENT DOCUMENTS

| | | |
|---|---|---|
| CN | 110896267 B | 3/2020 |
| CN | 211352009 U | 8/2020 |
| CN | 215420039 U | 1/2022 |
| CN | 114337181 A | 4/2022 |
| CN | 216982112 U | 7/2022 |
| CN | 217984822 U | 12/2022 |

* cited by examiner

*Primary Examiner* — Zoheb S Imtiaz
(74) *Attorney, Agent, or Firm* — Ladas & Parry LLP (57) ABSTRACT

A suspended vibration exciter includes a vibration assembly and a holder. The vibration assembly includes an electromagnetic coil, a permanent-magnetic moving iron, and an elastic connection piece. An electromagnetic field generated by the electromagnetic coil causes the permanent-magnetic moving iron to vibrate, and the holder transfers and superimposes the vibration generated by the vibration assembly, such that the volume of the entire vibration assembly is reduced and the vibration efficiency is improved. A hyperbolic-wave vibration generator includes an elastic vibration piece, a support portion, and at least one set of the suspended vibration exciter.

15 Claims, 5 Drawing Sheets

SUSPENDED VIBRATION EXCITER, HYPERBOLIC-WAVE VIBRATION GENERATOR AND METHOD FOR GENERATING VIBRATION EXCITATION

CROSS REFERENCE TO RELATED APPLICATION

This application claims priority to Chinese Patent Application No. 202211658740.5, filed on Dec. 22, 2022, which is hereby incorporated by reference in its entirety.

TECHNICAL FIELD

The present disclosure relates to the technical field of mechanical vibrations, and in particular, relates to a suspended vibration exciter, a hyperbolic wave-vibration generator and a method for generating vibration excitation.

BACKGROUND

A vibration exciter or vibration generator is a device for obtaining mechanical vibrations by means of electrical, electrohydraulic, piezoelectric or other means. The principle of the vibration exciter or vibration generator is to input an excitation signal into a coil placed in a magnetic field to drive a stage connected to the coil. The conventional vibration exciter has a large structure and is difficult to be applied to a small-sized device which needs vibration, and has a limited vibration amplitude and a low vibration efficiency.

SUMMARY

Various embodiments of the present disclosure provide a suspended vibration exciter. The suspended vibration exciter includes a vibration assembly configured to generate vibrations, and a holder configured to support and secure the vibration assembly. The holder includes a top plate and a side wall, the top plate is perpendicular to a direction of gravity, and the side wall extends from an edge of the top plate along the direction of gravity and is of a tubular shape. The vibration assembly includes an electromagnetic coil, a permanent-magnetic moving iron, and an elastic connection piece; the electromagnetic coil is disposed inside the holder, and a first end of the electromagnetic coil is securely connected to the top plate; a groove is disposed in one end face of the permanent-magnetic moving iron, and the groove is disposed in correspondence with a second end of the electromagnetic coil and is configured to accommodate the second end of the electromagnetic coil; and an opening is disposed in the elastic connection piece, an outer side wall of the permanent-magnetic moving iron is securely connected to an edge of the opening in the elastic connection piece, and an outer circumference of the elastic connection piece is securely connected to the holder.

In some embodiments, the elastic connection piece includes two or more than two concentric annular structures and at least one connection portion; each of the at least one connection portion is configured to connect two adjacent concentric annular structures; and the opening in the elastic connection piece is formed by an innermost annular structure of the two or more than two concentric annular structures, and the outer circumference of the elastic connection piece is formed by an outermost annular structure of the two or more than two concentric annular structures.

In some embodiments, an opening is disposed in the top plate, an outer side wall of the first end of the electromagnetic coil is securely connected to an edge of the opening in the top plate, or a base plate is disposed at the first end of the electromagnetic coil, and the base plate is securely connected to an edge of the opening in the top plate.

In some embodiments, an L-shaped bent connection portion is disposed on the outer circumference of the elastic connection piece, the L-shaped bent connection portion is connected to the side wall of the holder by engagement of a nut and a screw, or connected to the side wall of the holder by an adhesive, or welded to the side wall of the holder.

In some embodiments, a threaded hole is disposed in an end face of an end of the top plate not connected to the side wall of the holder, and the outer circumference of the elastic connection piece is connected to the holder by engagement of a screw and the threaded hole in the side wall of the holder.

In some embodiments, two or more than two first bosses are disposed on the holder, the two or more than two first bosses are close to an inner side of the side wall of the holder, and the outer circumference of the elastic connection piece is connected to the two or more than two first bosses via an adhesive or welded to the two or more than two first bosses;

In some embodiments, two or more than two first bosses are disposed on the holder, the two or more than two first bosses are close to an inner side of the side wall of the holder, each of the two or more than two first bosses is provided with a threaded hole, and the outer circumference of the elastic connection piece is connected to the two or more than two bosses by engagement of the threaded hole in each of the two or more than two first bosses and a corresponding screw.

In some embodiments, two or more than two first bosses are disposed on the holder, the two or more than two first bosses are close to an inner side of the side wall of the holder, a second boss is disposed next to each of the two or more than two first bosses, each second boss is provided with a threaded hole, and the suspended vibration exciter is securely connected to an external device by engagement of the threaded hole in each of the second bosses and a corresponding screw.

In the suspended vibration exciter according to the embodiments of the present disclosure, the electromagnetic coil is disposed inside the holder and the first end of the electromagnetic coil is securely connected to the top plate of the holder, the outer circumference of the elastic connection piece is securely connected to the holder, the outer side wall of the permanent-magnetic moving iron is securely connected to the edge of the opening of the elastic connection piece such that the permanent-magnetic moving iron is suspended, and under action of the magnetic field force, the gravity thereof, and the elastic force of the elastic connection piece, the permanent-magnetic moving iron reciprocates, thereby improving the vibration efficiency. In addition, the groove is disposed in one end face of the permanent-magnetic moving iron, and the groove is capable of accommodating part of the electromagnetic coil. With such configurations, the structure is simple, the thickness of the vibration exciter is greatly reduced, and the applicability of the vibration exciter is improved. In addition, the elastic connection piece may be provided with two or more than two concentric annular structures and a connection portion. With such configurations, the elasticity of the elastic connection piece is further enhanced, and the vibration efficiency of the vibration exciter is improved.

Various embodiments of the present disclosure further provide method for generating vibration excitation of a suspended vibration exciter. The suspended vibration exciter includes an electromagnetic coil, a permanent-magnetic moving iron, an elastic connection piece, and a holder; the electromagnetic coil is disposed inside the holder, and a first end of the electromagnetic coil is securely connected to a top plate of the holder; a groove is disposed in one end face of the permanent-magnetic moving iron, and the groove is disposed in correspondence with a second end of the electromagnetic coil and is configured to accommodate the second end of the electromagnetic coil; and an opening is disposed in the elastic connection piece, an outer side wall of the permanent-magnetic moving iron is securely connected to an edge of the opening in the elastic connection piece, and an outer circumference of the elastic connection piece is securely connected to the holder. The electromagnetic coil generates a first magnetic field force in response to being supplied with a first current; under action of the first magnetic field force and a gravity of the permanent-magnetic moving iron, the permanent-magnetic moving iron moves from an initial position along a direction away from the electromagnetic coil, so as to cause the elastic connection piece to be elastically deformed along a direction away from the electromagnetic coil to generate a first elastic force; in response to the permanent-magnetic moving iron moving to a position away from a vibration peak of the electromagnetic coil, under action of the first elastic force, the permanent-magnetic moving iron moves along a direction close to the electromagnetic coil; and in response to the permanent-magnetic moving iron moving to a position close to the vibration peak of the electromagnetic coil, under action of the gravity of the permanent-magnetic moving iron, the permanent-magnetic moving iron moves along a direction away from the electromagnetic coil.

In some embodiments, in response to the permanent-magnetic moving iron moving to the position away from the vibration peak of the electromagnetic coil, a direction of the first current is reversed to generate a second magnetic field force, and under action of the second magnetic field force and the first elastic force, the permanent-magnetic moving iron moves along the direction close to the electromagnetic coil and cuts a magnetic line of force to generate a second current having the same direction as the first current, such that the first current and the second current are superimposed and amplified.

In some embodiments, in response to the permanent-magnetic moving iron moving to the position close to the vibration peak of the electromagnetic coil, the direction of the first current is reversed once more to generate the first magnetic field force; and under action of the first magnetic field force and the gravity of the permanent-magnetic moving iron, the permanent-magnetic moving iron moves along the direction away from the electromagnetic coil.

In some embodiments, in response to the permanent-magnetic moving iron moving to the position close to the vibration peak of the electromagnetic coil, the position of the vibration peak of the electromagnetic coil being closer to the electromagnetic coil relative to an initial position of the elastic connection piece, the elastic connection piece is elastically deformed along the direction close to the electromagnetic coil to generate a second elastic force; and under action of the second elastic force, the first magnetic field force, and the gravity of the permanent-magnetic moving iron, the permanent-magnetic moving iron moves along the direction away from the electromagnetic coil.

In some embodiments, in response to the permanent-magnetic moving iron reciprocating, the elastic connection piece transfers a vibration generated by the permanent-magnetic moving iron to the holder, the holder and the permanent-magnetic moving iron simultaneously generates vibrations, and the vibration of the holder and the vibration generated by the permanent-magnetic moving iron are superimposed.

In the method for generating vibration excitation of the suspended vibration exciter according to the embodiments of the present disclosure, the electromagnetic field generated by the electromagnetic coil causes the permanent-magnetic moving iron to vibrate. The permanent-magnetic moving iron reciprocates under action of the magnetic field force, the gravity thereof, and the elastic force of the elastic connection piece, such that the vibration efficiency is improved. In addition, the holder supports and secures the vibration assembly and transfers the vibration generated by the vibration assembly, such that the vibration of the holder and the vibration generated by the permanent-magnetic moving iron are superimposed. In this way, the vibration efficiency is further enhanced.

Various embodiments of the present disclosure further provide a hyperbolic-wave vibration generator. The hyperbolic-wave vibration generator includes an elastic vibration piece, a support portion, and at least one set of the suspended vibration exciter as described above. The elastic vibration piece is arch-shaped, strip-shaped through holes are disposed in the elastic vibration piece, and two L-shaped support bases each with an opening therein are disposed at two ends along a lengthwise direction of the elastic vibration piece respectively, each of the two L-shaped support bases includes a side plate and a bottom plate, the side plate is positioned between the bottom plate and the elastic vibration piece, and a connection portion is disposed between the two bottom plates of each of the two L-shaped support bases; the support portion is disposed between an inner surface of the elastic vibration piece and the connection portion, and is configured to support the elastic vibration piece; and the at least one set of the suspended vibration exciter includes two suspended vibration exciters, the two suspended vibration exciters are securely connected to the inner surface of the elastic vibration piece, and a distance between the two suspended vibration exciters is half of a wavelength of vibration waves generated by the suspended vibration exciters.

In some embodiments, the two suspended vibration exciters are configured to generate vibrations having the same frequency and transfer the vibrations to the elastic vibration piece, such that the elastic vibration piece generates a hyperbolic-wave vibration.

In the hyperbolic-wave vibration generator according to the embodiments of the present disclosure, the two L-shaped support bases each with an opening therein are disposed at two ends in the lengthwise direction of the elastic vibration piece, and the two suspended vibration exciters are securely connected to the inner surfaces of the elastic vibration piece, such that in the case that the vibration generator is under a pressure, the vibration is not inhibited or transfer of the vibration is not prevented. In this way, the risk that the vibration is suppressed in the case of the pressure applied by a heavy object is avoided. In addition, the two suspended vibration exciters generate vibrations having the same frequency and transfer the vibrations to the elastic vibration piece, such that the elastic vibration piece generates a hyperbolic-wave vibration, and thus the vibration effect is significant. Further, uniform transfer of the vibration waves is implemented by the elastic vibration piece, the vibration area is enlarged, and an effect of surface vibration is achieved.

BRIEF DESCRIPTION OF THE DRAWINGS

For clearer descriptions of the technical solutions according to the specific embodiments of the present disclosure or the technical solutions in the related art, the accompanying drawings incorporated for illustrating the specific embodiments or the related art are briefly described hereinafter. Apparently, the accompanying drawings described hereinafter only illustrate some embodiments of the present disclosure, and other accompanying drawings may also be derived by persons of ordinary skill in the art based on these accompanying drawings without any creative effort.

REFERENCE NUMERALS AND DENOTATIONS THEREOF

1—vibration assembly;
2—holder;
21—top plate;
22—side wall;
211—opening in the top plate;
11—electromagnetic coil;
12—permanent-magnetic moving iron;
13—elastic connection piece;
121—groove;
131—opening in the elastic connection piece;
23—first boss;
24—second boss;
132—concentric annular structure;
1321—innermost annular structure;
1322—outermost annular structure;
133—connection portion;
221—end face of side wall of holder;
3—hyperbolic-wave vibration generator;
31—elastic vibration piece;
311—strip-shaped through hole;
32—L-shaped support base;
321—side wall of L-shaped support base;
322—bottom plate of L-shaped support base;
33—support portion;
34—connection portion;
35—suspended vibration exciter.

DETAILED DESCRIPTION

In the description of the present disclosure, it should be understood that the terms "central," "transversal," "longitudinal," "upper," "lower," "front," "rear," "left," "right," "vertical," "horizontal," "top," "bottom," "inner," "outer," and the like indicate orientations and position relationships which are based on the illustrations in the accompanying drawings, and these terms are merely for ease and brevity of the description, instead of indicating or implying that the devices or elements shall have a particular orientation and shall be structured and operated based on the particular orientation. Accordingly, these terms shall not be construed as limiting the present disclosure. In addition, terms of "first" and "second" are only used for description, but shall not be understood as indication or implication of relative importance or implicit indication of the number of the specific technical features. Therefore, the features defined by the terms "first" and "second" may explicitly or implicitly include one or more of these features. During the description of the present disclosure, the term "multiple," "more," or "a plurality of" refers to two or more than two unless otherwise specified.

The present disclosure is further described hereinafter with reference to the accompanying drawings.

First Embodiment

This embodiment provides a suspended vibration exciter. The suspended vibration exciter includes a vibration assembly configured to generate vibrations, and a holder configured to support and secure the vibration assembly. The holder includes a top plate and a side wall, the top plate is perpendicular to a direction of gravity, and the side wall extends from an edge of the top plate along the direction of gravity and is of a tubular shape. The vibration assembly includes an electromagnetic coil, a permanent-magnetic moving iron, and an elastic connection piece; the electromagnetic coil is disposed in the holder, and one end of the electromagnetic coil is securely connected to the top plate; a groove is disposed in one end face of the permanent-magnetic moving iron, and the groove is disposed in correspondence with the other end of the electromagnetic coil and is configured to accommodate the other end of the electromagnetic coil; and an opening is disposed in the elastic connection piece, an outer side wall of the permanent-magnetic moving iron is securely connected to an edge of the opening in the elastic connection piece, and an outer circumference of the elastic connection piece is securely connected to the holder.

Figure 1:
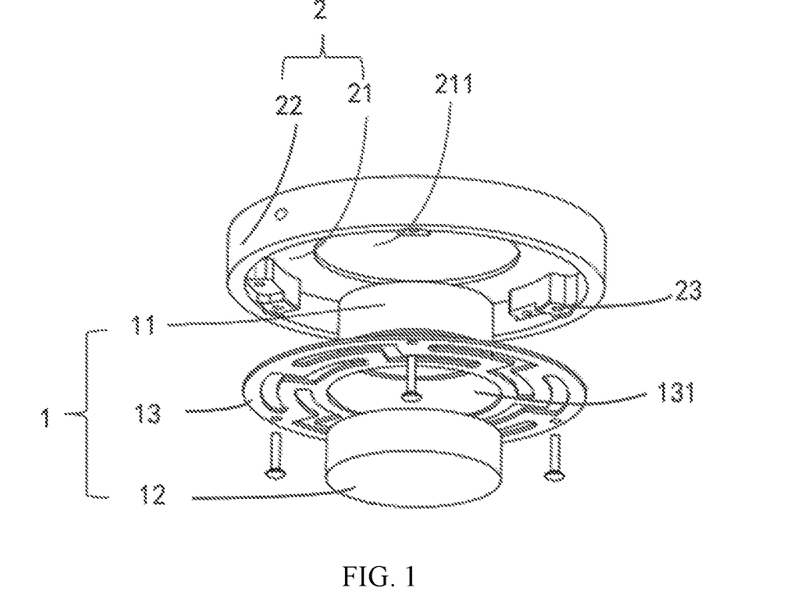
FIG. 1 is an exploded view of a suspended vibration exciter according to an embodiment of the present disclosure.
Figure 2:
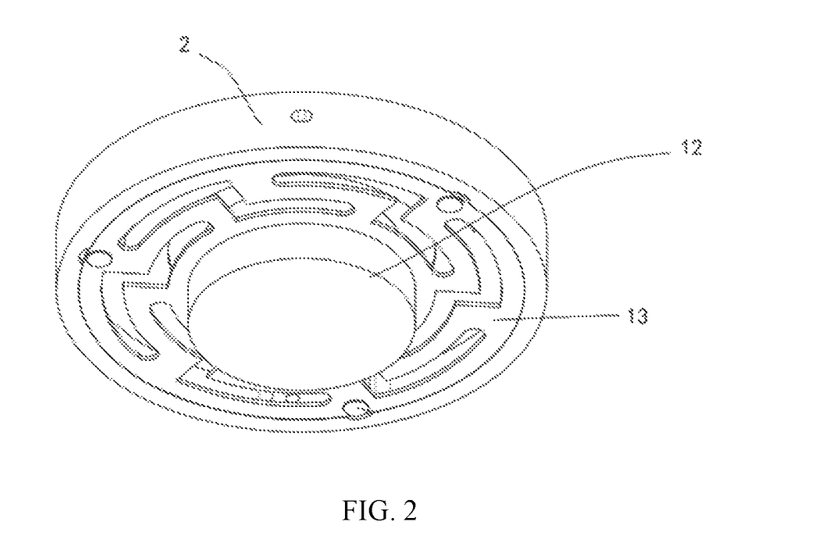
FIG. 2 is a schematic structural view of a suspended vibration exciter according to an embodiment of the present disclosure.

Hereinafter, the operating principles of the suspended vibration exciter is described in detail using the suspended vibration exciter as illustrated in FIGS. 1 to 4 as an example. As illustrated in FIG. 1, the suspended vibration exciter includes a vibration assembly 1 and a holder 2. The holder 2 includes a top plate 21 and a side wall 22. The top plate 21 is perpendicular to a direction of gravity. The side wall 22 extends from an edge of the top plate 21 along the direction of gravity and is in a tubular shape. In the present disclosure, the top plate 21 matches a shape of a cross section of the side wall 22. In the present disclosure, the shape of the cross section of the side wall 22 is not limited. For example, the cross section of the side wall 22 may be a circular shape, a polygonal shape, or an irregular shape, which may be specifically designed and selected according to actual needs.

Further, the vibration assembly 1 includes an electromagnetic coil 11, a permanent-magnetic moving iron 12, and an elastic connection piece 13. The electromagnetic coil 11 is disposed in the holder 2, and a first end of the electromagnetic coil 11 is securely connected to the top plate 21. In an optional embodiment, an opening 211 is disposed in the top plate 21, and an outer side wall of the first end of the electromagnetic coil 11 is securely connected to an edge of the opening 211 by, for example, an adhesive, welding, or the like. In a further optional embodiment, an opening 211 is disposed in the top plate 21, and a base plate is disposed at the first end of the electromagnetic coil 11. The base plate is securely connected to an edge of the opening 211 in the top plate 21 by, for example, an adhesive, welding, or the like. In the present disclosure, the outer side wall of the electromagnetic coil 11 matches the shape of the opening 211 in the top plate. In the present disclosure, the shape of the opening 211 in the top plate is not limited. For example, the opening 211 in the top plate may be a circular shape, a polygonal shape, or an irregular shape, which may be specifically designed and selected according to actual needs of the product.

Further, a groove 121 is disposed in one end face of the permanent-magnetic moving iron 12. The groove 121 is disposed corresponding to a second end of the electromagnetic coil 11, and configured to accommodate the second end of the electromagnetic coil 11. An opening 131 is disposed in the elastic connection piece 13. An outer side wall of the permanent-magnetic moving iron 12 is securely connected to an edge of the opening 131 in the elastic connection piece by, for example, an adhesive, welding, or the like. In the present disclosure, the outer side wall of the permanent-magnetic moving iron 12 matches a shape of the opening 131 in the elastic connection piece. In the present disclosure, the shape of the opening 131 in the elastic connection piece is not limited. For example, the opening 131 in the elastic connection piece may be a circular shape, a polygonal shape, or an irregular shape, which may be specifically designed and selected according to actual needs of the product.

Further, an outer circumference of the elastic connection piece 13 is securely connected to the holder 2. In the embodiments of the present disclosure, the outer side wall of the permanent-magnetic moving iron 12 is securely connected to an edge of the opening of the elastic connection piece 13, and the outer circumference of the elastic connection piece 13 is connected to the holder 2, such that the permanent-magnetic moving iron 12 is suspended.

In an optional embodiment, an L-shaped bent connection portion is disposed on the outer circumference of the elastic connection piece 13. The L-shaped bent connection portion is connected to the side wall 22 of the holder by engagement of a nut and a screw, or connected to the side wall 22 of the holder by an adhesive, or welded to the side wall of the holder. The L-shaped bent connection portion may be contiguous along the outer circumference of the elastic connection piece 13, or a plurality of separated L-shaped bent connection portions may be disposed, which is not limited in the present disclosure.

In a further optional embodiment, a threaded hole is disposed in an end face 221 of an end, which is not connected to the top plate, of the side wall 22 of the holder, and the outer circumference of the elastic connection piece 13 is connected to the end face 221 of the side wall of the holder by engagement of a screw and a threaded hole in the end face 221. In the present disclosure, the number of threaded holes in the end face 221 of the side wall of the holder is not limited, which may be, for example, 2, 3, 4, 6, 8, or the like.

Figure 4:
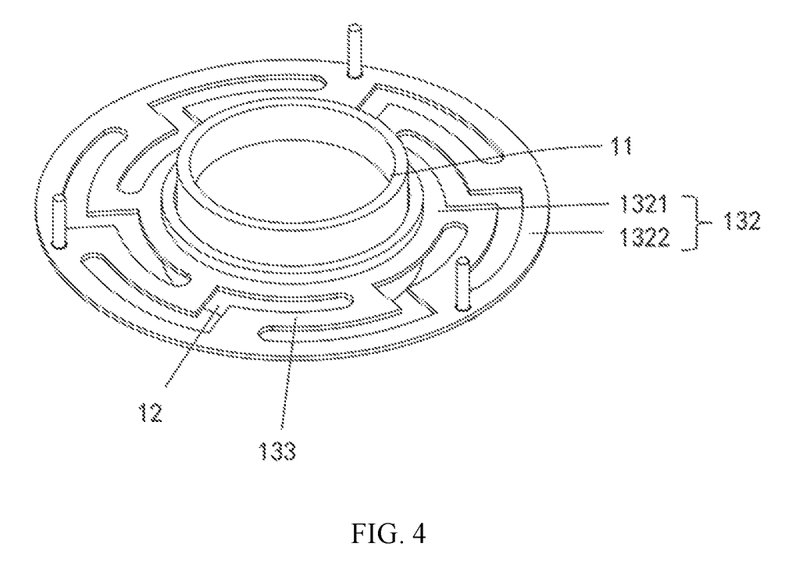
FIG. 4 is a view of partial pieces of an elastic connection piece of a suspended vibration exciter according to an embodiment of the present disclosure.
Figure 5:
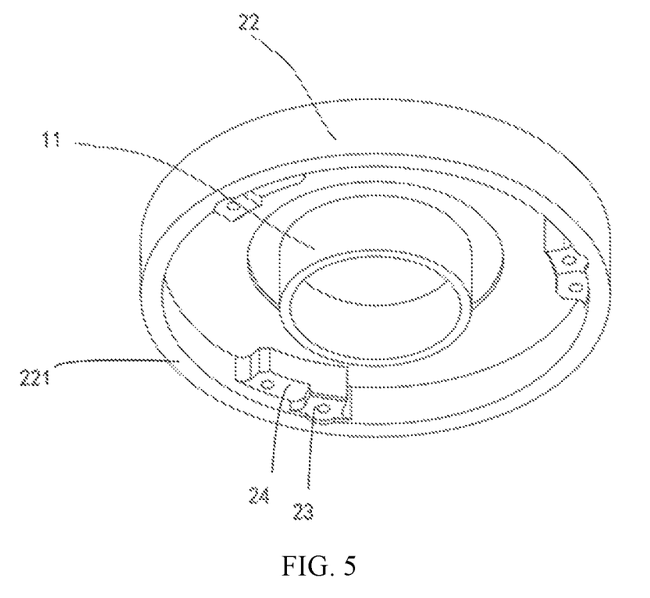
FIG. 5 is a view of partial pieces of a holder of a suspended vibration exciter according to an embodiment of the present disclosure.

In a further optional embodiment, as illustrated in FIG. 1 and FIG. 4, two or more than two first bosses 23, for example, three first bosses 23, are disposed on the holder 2. The two or more than two first bosses 23 are close to an inner side of the side wall 22 of the holder. The outer circumference of the elastic connection piece 13 is connected to the first bosses 23 by an adhesive or welded to the first bosses 23. In the present disclosure, a shape of each of the first bosses 23 is not limited, for example, a rectangular shape, a cylindrical shape, or an irregular shape, which may be specifically designed and selected according to actual needs. Optionally, a second boss 24 is disposed next to each of the first bosses 23. A threaded hole is disposed in each of the second bosses 24. The suspended vibration exciter is securely connected to an external device by engagement of the threaded holes in the second bosses 24 and corresponding screws.

In a further optional embodiment, two or more than two first bosses 23, for example, three first bosses 23, are disposed on the holder 2, the first bosses 23 are close to an inner side of the side wall 22 of the holder 2, a threaded hole is disposed in each of the first bosses 23, and the outer circumference of the elastic connection piece 13 is connected to the first bosses 23 by engagement of the threaded holes in the first bosses 23 and corresponding screws. In the present disclosure, a shape of each of the first boss 23 is not limited, for example, a rectangular shape, a cylindrical shape, or an irregular shape, which may be specifically designed and selected according to actual needs of the product. Optionally, an adhesive may be applied between the elastic connection piece 13 and the screws to strengthen connection between the first bosses 23 and the elastic connection piece 13. Optionally, a second boss 24 is disposed next to each of the first bosses 23. A threaded hole is disposed in each of the second bosses 24. The suspended vibration exciter is securely connected to an external device by engagement of the threaded holes in the second bosses 24 and corresponding screws.

In the embodiment of the present disclosure, the elastic connection piece is made of a highly elastic metal material, and the elastic connection piece may only include one opening for connecting the permanent-magnetic moving iron or may include two or more than two concentric annular structures and at least one connection portion. Each of the at least one connection portion is positioned between two adjacent concentric annular structures, and configured to connect the two adjacent concentric annular structures. The opening in the elastic connection piece is formed by an innermost annular structure of the concentric annular structures, and the outer circumference of the elastic connection piece is formed by an outermost annular structure of the concentric annular structures. The outermost annular structure of the concentric annular structures is connected to the side wall of the holder by engagement of the screw and the threaded hole in the side wall, or connected to the boss of the holder by engagement of the screws and the threaded holes in the bosses, or directly securely connected to the bosses of the holder by an adhesive, welding, or the like. The shape and number of connection portions are not limited. For example, the connection portion 133 may be in an S shape, a Z shape, a straight line shape, an irregular shape, or the like; and the number of connection portions may be 2, 3, 4, 6, 8, or the like. The shape and the number may both be designed and selected according to actual needs.

Figure 3:
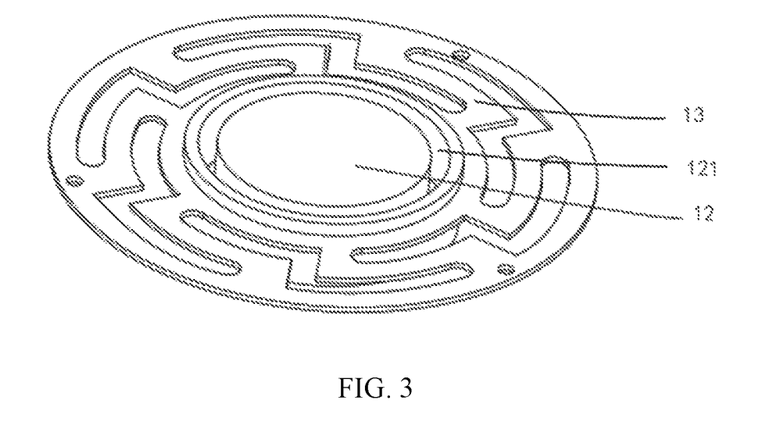
FIG. 3 is a view of partial pieces of a permanent-magnetic moving iron of a suspended vibration exciter according to an embodiment of the present disclosure.

In the embodiment as illustrated in FIG. 3, the elastic connection piece includes two concentric annular structures 132 and six Z-shaped connection portions 133. The opening 131 in the elastic connection piece is formed by an innermost annular structure 1321 of the concentric annular structures, and the outer circumference of the elastic connection piece is formed by an outermost annular structure 1322 of the concentric annular structures. The outermost annular structure 1322 of the concentric annular structures is connected to the first bosses 23 of the holder by engagement of the threaded holes in the first bosses 23 and the corresponding screws. The six Z-shaped connection portions 132 are positioned between the annular structure 1321 and the annular structure 1322, and connected between the annular structure 1321 and the annular structure 1322. In the present disclosure, by disposing two or more than two concentric annular structures 132 and at least one connection portion 133 on the elastic connection piece, the elasticity of the elastic connection piece is further enhanced. In this way, in the case that the permanent-magnetic moving iron reciprocates in the suspended vibration exciter, an elastic force is supplied for the permanent-magnetic moving iron, and the vibration efficiency is amplified.

In the suspended vibration exciter according to the embodiments of the present disclosure, the electromagnetic coil is disposed inside the holder and the first end of the electromagnetic coil is securely connected to the top plate of the holder, the outer circumference of the elastic connection piece is securely connected to the holder, the outer side wall of the permanent-magnetic moving iron is securely connected to the edge of the opening of the elastic connection piece such that the permanent-magnetic moving iron is suspended, and under action of the magnetic field force, the gravity thereof, and the elastic force of the elastic connection piece, the permanent-magnetic moving iron reciprocates, thereby improving the vibration efficiency. In addition, the groove is disposed in one end face of the permanent-magnetic moving iron, and the groove is capable of accommodating part of the electromagnetic coil. With such configurations, the structure is simple, the thickness of the vibration exciter is greatly reduced, and the applicability of the vibration exciter is improved. In addition, the elastic connection piece may be provided with two or more than two concentric annular structures and at least one connection portion. With such configurations, the elasticity of the elastic connection piece is further enhanced, and the vibration efficiency of the vibration exciter is improved.

Second Embodiment

This embodiment provides a method for generating vibration excitation of a suspended vibration exciter. The suspended vibration exciter may be any of the suspended vibration exciters as described in the first embodiment. This embodiment, using the suspended vibration exciter as an example, illustrates the method for generating vibration excitation of the suspended vibration exciter.

In step 101, the electromagnetic coil 11 generates a first magnetic field force $E_1$ in response to being supplied with a first current $I_1$, the first current $I_1$ is a sinusoidal alternating current.

In step 102, under action of the first magnetic field force $E_1$ and a gravity G of the permanent-magnetic moving iron 12, the permanent-magnetic moving iron 12 moves from an initial position along a direction away from the electromagnetic coil 11, and causes the elastic connection piece 13 to be elastically deformed along a direction away from the electromagnetic coil 11 to generate a first elastic force $F_1$.

In step 103, in the case that the permanent-magnetic moving iron 12 moves to a position away from a vibration peak of the electromagnetic coil 11, under action of the first elastic force $F_1$, the permanent-magnetic moving iron 12 moves along a direction close to the electromagnetic coil 11.

In step 104, in the case that the permanent-magnetic moving iron 12 moves to a position close to the vibration peak of the electromagnetic coil 11, under action of the gravity G of the permanent-magnetic moving iron 12, the permanent-magnetic moving iron 12 moves along the direction away from the electromagnetic coil 11.

Optionally, the method further includes: in response to the permanent-magnetic moving iron 12 moving to the position away from the vibration peak of the electromagnetic coil 11, a current direction of the first current $I_1$ is reversed to generate a second magnetic field force $E_2$, and under action of the second magnetic field force $E_2$ and the first elastic force $F_1$, the permanent-magnetic moving iron 12 moves along the direction close to the electromagnetic coil 11 and cuts lines of magnetic force to generate a second current $I_2$ having the same current direction as the first current $I_1$, such that the first current $I_1$ and the second current $I_2$ are superimposed. In this way, the current is amplified, and the vibration efficiency is further improved.

Optionally, the method further includes: in response to the permanent-magnetic moving iron 12 moving to the position close to the vibration peak of the electromagnetic coil 11, the current direction of the first current $I_1$ is reversed once more to generate the first magnetic field force $E_1$; and under action of the first magnetic field force $E_1$ and the gravity G of the permanent-magnetic moving iron 12, the permanent-magnetic moving iron 12 moves along the direction away from the electromagnetic coil 11. The permanent-magnetic moving iron 12 is under the action of the first magnetic field force $E_1$ in addition to the gravity G thereof. In this way, the power of the permanent-magnetic moving iron 12 is increased, and the vibration efficiency is improved.

Further, in response to the permanent-magnetic moving iron 12 moving to the position close to the vibration peak of the electromagnetic coil 11, the position of the vibration peak of the electromagnetic coil 11 is closer to the electromagnetic coil 11 relative to an initial position of the elastic connection piece 13, and therefore, the elastic connection piece 13 is elastically deformed along the direction close to the electromagnetic coil 11 to generate a second elastic force $F_2$; and under action of the second elastic force $F_2$, the first magnetic field force $E_1$, and the gravity G of the permanent-magnetic moving iron 12, the permanent-magnetic moving iron 12 moves along the direction away from the electromagnetic coil 11. The permanent-magnetic moving iron 12 is under the action of the second elastic force $F_2$ in addition to the gravity G thereof and the first magnetic field force $E_1$. In this way, the power of the permanent-magnetic moving iron 12 is increased, and the vibration efficiency is improved.

Optionally, the method further includes: in response to the permanent-magnetic moving iron 12 reciprocating, the elastic connection piece 13 transfers a vibration generated by the permanent-magnetic moving iron 12 to the holder 2, the holder 2 and the permanent-magnetic moving iron 12 simultaneously generate vibrations, and the vibration of the holder 2 and the vibration generated by the permanent-magnetic moving iron 12 are superimposed. In this way, the vibration efficiency is further improved.

In the method for generating vibration excitation of the suspended vibration exciter according to the embodiments of the present disclosure, the electromagnetic field generated by the electromagnetic coil causes the permanent-magnetic moving iron to generate vibration. Since the permanent-magnetic moving iron is suspended, the permanent-magnetic moving iron reciprocates under action of the magnetic field force, the gravity of the permanent-magnetic moving iron, and the elastic force of the elastic connection piece, such that the vibration efficiency is improved. In addition, the holder supports and is securely connected to the vibration assembly, and the holder transfers the vibration generated by the vibration assembly, such that the vibration of the holder and the vibration generated by the permanent-magnetic moving iron are superimposed. In this way, the vibration efficiency is further enhanced.

Third Embodiment

This embodiment provides a hyperbolic-wave vibration generator. The hyperbolic-wave vibration generator includes an elastic vibration piece, a support portion, and at least one set of the suspended vibration exciter as described in the first embodiment. The elastic vibration piece is arch-shaped, strip-shaped through holes are disposed in the elastic vibration piece, and two L-shaped support bases each with an opening therein are disposed at two ends along a lengthwise direction of the elastic vibration piece respectively. Each of the two L-shaped support bases includes a side plate and a bottom plate. The side plate is positioned between the bottom plate and the elastic vibration piece, and a connection portion is disposed between two bottom plates of the two L-shaped support bases. The support portion is disposed between an inner surface of the elastic vibration piece and the connection portion, and is configured to support the elastic vibration piece. The at least one set of suspended vibration exciter includes two suspended vibration exciters. The two suspended vibration exciters are securely connected to the inner surface of the elastic vibration piece, the two suspended vibration exciters are configured to two vibration waves with a same wavelength, and a distance between the two suspended vibration exciters is half of the wavelength of the two vibration waves generated by the two suspended vibration exciters.

Figure 6:
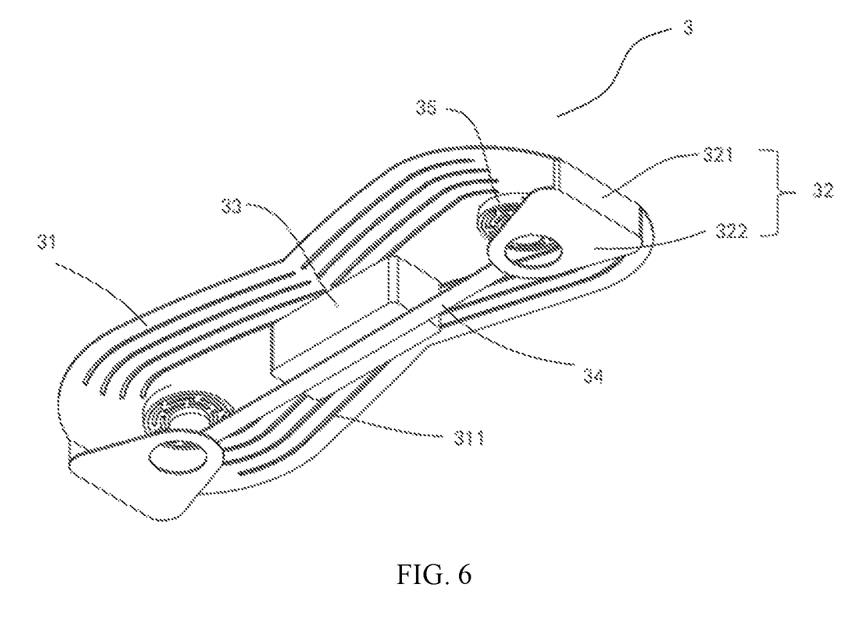
FIG. 6 is a schematic structural view of a hyperbolic-wave vibration generator according to an embodiment of the present disclosure.
Figure 7:
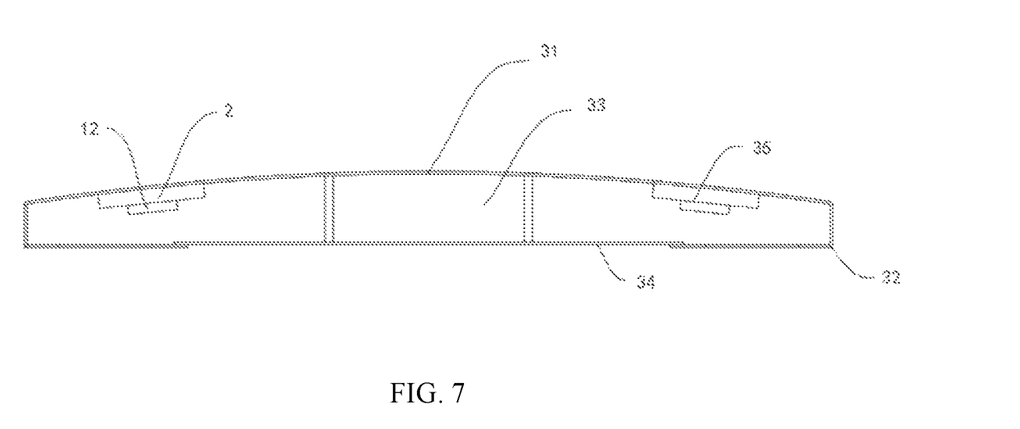
FIG. 7 is a front view of a hyperbolic-wave vibration generator according to an embodiment of the present disclosure.
Figure 8:
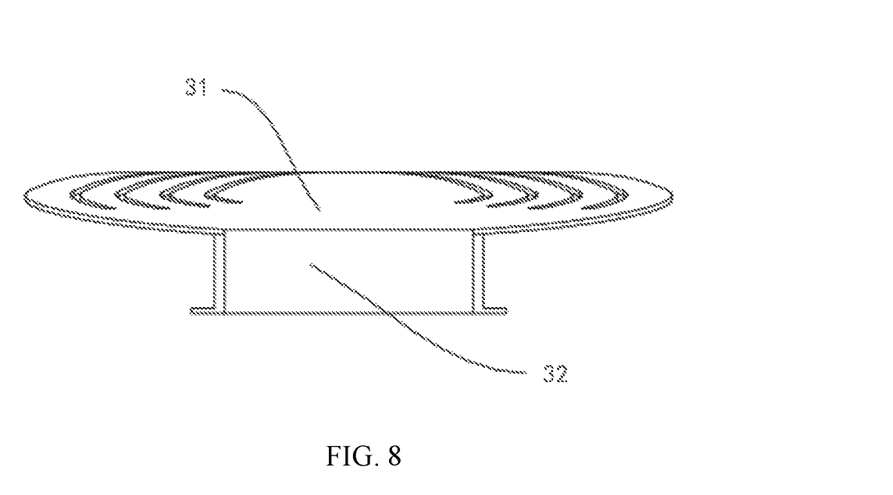
FIG. 8 is a side view of a hyperbolic-wave vibration generator according to an embodiment of the present disclosure.

Hereinafter, the operating principles of the hyperbolic-wave vibration generator is described in detail using the hyperbolic-wave vibration generator as illustrated in FIGS. 6 to 8 as an example. As illustrated in FIG. 6, a hyperbolic-wave vibration generator 3 includes an elastic vibration piece 31, a support portion 33, and at least one set of the suspended vibration exciter 35 as illustrated in the first embodiment. The elastic vibration piece 31 is arch-shaped, and strip-shaped through holes are disposed in the elastic vibration piece 31. With the arch-shape of the elastic vibration piece 31, the vibration generated by the suspended vibration exciter 35 is further amplified on the elastic vibration piece 31, and the vibration efficiency is improved. With the strip-shaped through holes 311 disposed in the elastic vibration piece 31, the inherent frequency of the elastic vibration piece 31 is changed, the transfer efficiency is improved, and the applicability of the hyperbolic-wave vibration generator 3 is enhanced. In the present disclosure, the material of the elastic vibration piece 31 is not limited. For example, the elastic vibration piece 31 may be made of a metal, a rubber, a composite material, or the like. In the present disclosure, the number of strip-shaped through holes 311 and a distance between two adjacent strip-shaped through holes 311 in the elastic vibration piece 31 are not limited, for example, the number of strip-shaped through holes 311 may be 4, 8, 16, or the like, and the distances between different two adjacent strip-shaped through holes 311 may be equal or different respectively. The number and the distances may be designed and selected according to actual needs.

Further, two L-shaped support bases 32 each with an opening therein are disposed at two ends along a lengthwise direction of the elastic vibration piece 31 respectively. Each of the two L-shaped support bases 32 includes a side plate 321 and a bottom plate 322. The side plate 321 is positioned between the bottom plate 322 and the elastic vibration piece 31, and a connection portion 34 is disposed between two bottom plates 322 of the two L-shaped support bases. In the present disclosure, the elastic vibration piece 31 and the two L-shaped support bases 32 may be integrally formed, such that a pressure-resistant strength of the hyperbolic-wave vibration generator 3 is enhanced. The bottom plate 322 of each of the two L-shaped support bases 32 may be provided with a through hole configured to allow passing through of one or more conductive wires of the suspended vibration exciter. With the two L-shaped support bases 32, even under a pressure, the vibration generated by the hyperbolic-wave vibration generator 35 is not inhibited or transfer of the vibration is not prevented. This avoids the risk that the vibration is inhibited in the case of the pressure applied by a heavy object. In the present disclosure, the shape and material of the connection portion 34 are not limited. For example, the connection portion 34 may be a rib having a pre-tension.

Further, the support base 33 is disposed between an inner surface of the elastic vibration piece 31 and the connection portion 34, and is configured to support the elastic vibration piece 31. In the present disclosure, the size, shape, or material of the support portion 33 is not limited. For example, the support portion 33 may be made of a sponge or a spring or the like. The size, shape, or material may be designed and selected according to actual needs.

Further, the at least one set of the suspended vibration exciter includes two suspended vibration exciters 35. The two suspended vibration exciters 35 are securely connected to the inner surface of the elastic vibration piece 31. The two suspended vibration exciters 35 are configured to generate two vibration waves with a same wavelength. A distance between the two suspended vibration exciters 35 is half of the wavelength of the two vibration waves generated by the two suspended vibration exciters 35. In the present disclosure, the practice of secured connection between the suspended vibration exciter 35 and the inner surface of the elastic vibration piece 31 is not limited. For example, the secured connection may be implemented by engagement of the screws and the threaded holes in the second bosses 24, by an adhesive, by welding, or the like.

Figure 9:
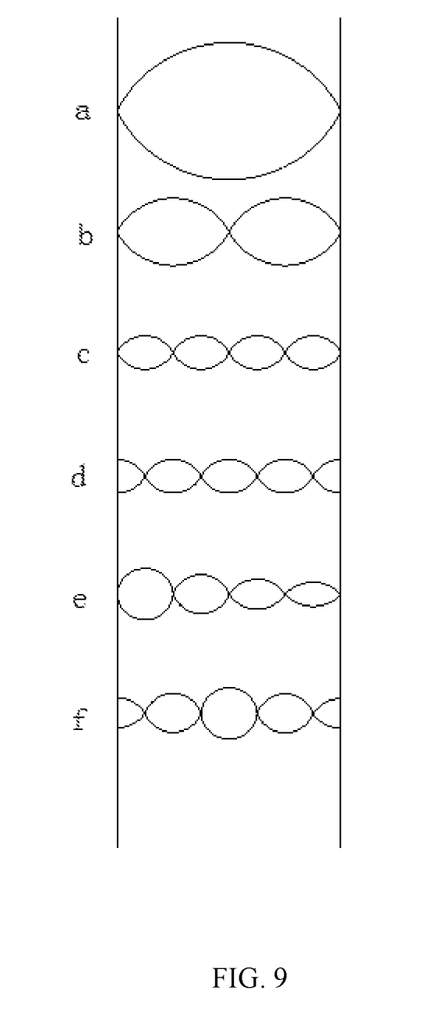
FIG. 9 is a waveform of generating a hyperbolic-wave vibration by a hyperbolic-wave vibration generator according to an embodiment of the present disclosure.

In some embodiments, the two suspended vibration exciters 35 are configured to generate vibrations having a same frequency and transfer the vibrations to the elastic vibration piece 31, such that the elastic vibration piece 31 generates a hyperbolic-wave vibration. As illustrated in FIG. 9, in a case that the two suspended vibration exciters generate vibrations having the same amplitude, the elastic vibration piece 31 generates hyperbolic-wave vibrations illustrated by waveforms a, b, c and d; and in a case that the two suspended vibration exciters generate vibrations having different amplitudes, the elastic vibration piece 31 generates hyperbolic-wave vibrations illustrated by waveforms e and f.

In the hyperbolic-wave vibration generator according to the embodiments of the present disclosure, the two L-shaped support bases each with an opening therein are disposed at two ends in the lengthwise direction of the elastic vibration piece, and the two suspended vibration exciters are securely connected to the inner surfaces of the elastic vibration piece, such that in the case that the vibration generator is under a pressure, the vibration is not inhibited or transfer of the vibration is not prevented. In this way, a risk that the vibration is suppressed in the case of the pressure applied by a heavy object is avoided. In addition, the two suspended vibration exciters generate vibrations having the same frequency and transfer the vibrations to the elastic vibration piece, such that the elastic vibration piece generates a hyperbolic-wave vibration, and thus the vibration effect is significant. Further, uniform transfer of the vibration waves is implemented by the elastic vibration piece, the vibration area is enlarged, and an effect of surface vibration is achieved.

The basic principle, main features and advantages of the present disclosure are described and illustrated above. A person skilled in the art would understand that the present disclosure is not limited to the above embodiments. The above embodiments and description in the specification are only intended to elaborate the principle of the present disclosure. Various variations and improvements may also be made to the present disclosure without departing from the spirit and scope of the present disclosure. These variations and improvements all fall within the projection scope defined by the appended claims.

What is claimed is:

1. A suspended vibration exciter, comprising: a vibration assembly configured to generate vibrations; and a holder configured to support and secure the vibration assembly; wherein the holder comprises a top plate and a side wall, the top plate is perpendicular to a direction of gravity, and the side wall extends from an edge of the top plate along the direction of gravity and is of a tubular shape; the vibration assembly comprises an electromagnetic coil, a permanent-magnetic moving iron, and an elastic connection piece; the electromagnetic coil is disposed inside the holder, and a first end of the electromagnetic coil is securely connected to the top plate; a groove is disposed in one end face of the permanent-magnetic moving iron, and the groove is disposed in correspondence with a second end of the electromagnetic coil and is configured to accommodate the second end of the electromagnetic coil; and an opening is disposed in the elastic connection piece, an outer side wall of the permanent-magnetic moving iron is securely connected to an edge of the opening in the elastic connection piece, and an outer circumference of the elastic connection piece is securely connected to the holder; wherein the elastic connection piece comprises two or more than two concentric annular structures and at least one connection portion; each of the at least one connection portion is configured to connect two adjacent concentric annular structures; and the opening in the elastic connection piece is formed by an innermost annular structure of the two or more than two concentric annular structures, and the outer circumference of the elastic connection piece is formed by an outermost annular structure of the two or more than two concentric annular structures.

2. The suspended vibration exciter according to claim 1, wherein
an opening is disposed in the top plate; and
an outer side wall of the first end of the electromagnetic coil is securely connected to an edge of the opening in the top plate, or a base plate is disposed at the first end of the electromagnetic coil, and the base pate is securely connected to an edge of the opening in the top plate.

3. The suspended vibration exciter according to claim 1, wherein an L-shaped bent connection portion is disposed on the outer circumference of the elastic connection piece, the L-shaped bent connection portion is connected to the side wall of the holder by engagement of a nut and a screw, or connected to the side wall of the holder by an adhesive, or welded to the side wall of the holder.

4. The suspended vibration exciter according to claim 1, wherein a threaded hole is disposed in an end face of an end of the top plate not connected to the side wall of the holder, and the outer circumference of the elastic connection piece is connected to the holder by engagement of a screw and the threaded hole in the side wall of the holder.

5. The suspended vibration exciter according to claim 1, wherein two or more than two first bosses are disposed on the holder, wherein the two or more than two first bosses are close to an inner side of the side wall of the holder, and the outer circumference of the elastic connection piece is connected to the two or more than two first bosses via an adhesive or welded to the two or more than two first bosses.

6. The suspended vibration exciter according to claim 1, wherein two or more than two first bosses are disposed on the holder, wherein the two or more than two first bosses are close to an inner side of the side wall of the holder, each of the two or more than two bosses is provided with a threaded hole, and the outer circumference of the elastic connection piece is connected to the two or more than two bosses by engagement of the threaded hole in each of the two or more than two first bosses and a corresponding screw.

7. The suspended vibration exciter according to claim 1, wherein two or more than two first bosses are disposed on the holder, wherein the two or more than two first bosses are close to an inner side of the side wall of the holder, a second boss is disposed next to each of the two or more than two first bosses, each second boss is provided with a threaded hole, and the suspended vibration exciter is securely connected to an external device by engagement of the threaded hole in each of the second bosses and a corresponding screw.

8. A method for generating vibration excitation by a suspended vibration exciter, wherein the suspended vibration exciter comprises an electromagnetic coil, a permanent-magnetic moving iron, an elastic connection piece, and a holder; wherein the electromagnetic coil is disposed inside the holder, and a first end of the electromagnetic coil is securely connected to a top plate of the holder; a groove is disposed in one end face of the permanent-magnetic moving iron, and the groove is disposed in correspondence with a second end of the electromagnetic coil and is configured to accommodate the second end of the electromagnetic coil; and an opening is disposed in the elastic connection piece, an outer side wall of the permanent-magnetic moving iron is securely connected to an edge of the opening in the elastic connection piece, and an outer circumference of the elastic connection piece is securely connected to the holder; and the method comprises: generating, by the electromagnetic coil, a first magnetic field force in response to being supplied with a first current, the first current being a sinusoidal alternating current; moving, under action of the first magnetic field force and a gravity of the permanent-magnetic moving iron, the permanent-magnetic moving iron from an initial position along a direction away from the electromagnetic coil, so as to cause the elastic connection piece to be elastically deformed along a direction away from the electromagnetic coil to generate a first elastic force; moving, under action of the first elastic force, the permanent-magnetic moving iron along a direction close to the electromagnetic coil in response to the permanent-magnetic moving iron moving to a position away from a vibration peak of the electromagnetic coil; and moving, under action of the gravity of the permanent-magnetic moving iron, the permanent-magnetic moving iron along a direction away from the electromagnetic coil in response to the permanent-magnetic moving iron moving to a position close to the vibration peak of the electromagnetic coil; wherein the elastic connection piece comprises two or more than two concentric annular structures and at least one connection portion; each of the at least one connection portion is configured to connect two adjacent concentric annular structures; and the opening in the elastic connection piece is formed by an innermost annular structure of the two or more than two concentric annular structures, and the outer circumference of the elastic connection piece is formed by an outermost annular structure of the two or more than two concentric annular structures.

9. The method according to claim 8, further comprising:
generating, in response to the permanent-magnetic moving iron moving to the position away from the vibration peak of the electromagnetic coil, a second magnetic field force based on a direction of the first current being reversed; and
moving, under action of the second magnetic field force and the first elastic force, the permanent-magnetic moving iron along the direction close to the electromagnetic coil and generating, based on the permanent-magnetic moving iron cutting a magnetic line of force, a second current having the same direction as the first current, such that the first current and the second current are superimposed and amplified.

10. The method according to claim 9, further comprising:
generating, in response to the permanent-magnetic moving iron moving to the position close to the vibration peak of the electromagnetic coil, the first magnetic field force based on the direction of the first current being reversed once more; and
moving, under action of the first magnetic field force and the gravity, the permanent-magnetic moving iron along the direction away from the electromagnetic coil.

11. The method according to claim 10, further comprising:
in response to the permanent-magnetic moving iron moving to the position close to the vibration peak of the electromagnetic coil, the position of the vibration peak of the electromagnetic coil being closer to the electromagnetic coil relative to an initial position of the elastic connection piece, generating, by the elastic connection piece, a second elastic force based on the elastic connection piece being elastically deformed along the direction close to the electromagnetic coil; and
moving, under action of the second elastic force, the first magnetic field force, and the gravity of the permanent-magnetic moving iron, the permanent-magnetic moving iron along the direction away from the electromagnetic coil.

12. The method according to claim 8, further comprising:
transferring, by the elastic connection piece, in response to the permanent-magnetic moving iron reciprocating, a vibration generated by the permanent-magnetic moving iron to the holder; and
simultaneously generating, by the holder and the permanent-magnetic moving iron, vibrations;
wherein the vibration of the holder and the vibration generated by the permanent-magnetic moving iron are superimposed.

13. A hyperbolic-wave vibration generator, comprising: an elastic vibration piece; a support portion; and at least one set of a suspended vibration exciter; wherein the support portion is configured to support the elastic vibration piece; the at least one set of suspended vibration exciter comprises two suspended vibration exciters, the two suspended vibration exciters are configured to generate two vibration waves with a same wavelength, the two suspended vibration exciters are securely connected to an inner surface of the elastic vibration piece, and a distance between the two suspended vibration exciters is half of the wavelength of the vibration waves; and each of the two suspended vibration exciters comprises an electromagnetic coil, a permanent-magnetic moving iron, an elastic connection piece, and a holder; wherein the electromagnetic coil is disposed inside the holder, and a first end of the electromagnetic coil is securely connected to a top plate of the holder; a groove is disposed in one end face of the permanent-magnetic moving iron, and the groove is disposed in correspondence with a second end of the electromagnetic coil and is configured to accommodate the second end of the electromagnetic coil; and an opening is disposed in the elastic connection piece, an outer side wall of the permanent-magnetic moving iron is securely connected to an edge of the opening in the elastic connection piece, and an outer circumference of the elastic connection piece is securely connected to the holder; wherein the elastic connection piece comprises two or more than two concentric annular structures and at least one connection portion; each of the at least one connection portion is configured to connect two adjacent concentric annular structures; and the opening in the elastic connection piece is formed by an innermost annular structure of the two or more than two concentric annular structures, and the outer circumference of the elastic connection piece is formed by an outermost annular structure of the two or more than two concentric annular structures.

14. The hyperbolic-wave vibration generator according to claim 13, wherein
the elastic vibration piece is arch-shaped, strip-shaped through holes are disposed in the elastic vibration piece, two L-shaped support bases each with an opening therein are disposed at two ends along a lengthwise direction of the elastic vibration piece respectively, each of the two L-shaped support bases comprises a side plate and a bottom plate, the side plate is positioned between the bottom plate and the elastic vibration piece, and a connection portion is disposed between the two bottom plates of each of the two L-shaped support bases; and
the support portion is disposed between the inner surface of the elastic vibration piece and the connection portion.

15. The hyperbolic-wave vibration generator according to claim 13, wherein the two suspended vibration exciters are configured to generate vibrations having a same frequency and transfer the vibrations to the elastic vibration piece, such that the elastic vibration piece generates a hyperbolic-wave vibration.

* * * * *